United States Patent [19]

Le Moigne et al.

[11] Patent Number: 4,615,988

[45] Date of Patent: Oct. 7, 1986

[54] GLASS FIBERS AND A COMPOSITION FOR MANUFACTURING THE SAME

[75] Inventors: Simone Le Moigne, Athis Mons; Marcel Boivent, Courbevoie; Guy Matzen, Paris, all of France

[73] Assignee: Isover Saint-Gobain, Courbevoie, France

[21] Appl. No.: 652,014

[22] Filed: Sep. 19, 1984

[30] Foreign Application Priority Data

Sep. 19, 1983 [FR] France .................. 8314834

[51] Int. Cl.⁴ .......................... C03C 3/04; C03C 13/00
[52] U.S. Cl. ...................................... 501/30; 501/35; 501/36; 501/57; 501/59
[58] Field of Search ........................ 501/30, 38, 36, 59, 501/35, 57, 58

[56] References Cited

U.S. PATENT DOCUMENTS

| 2,664,359 | 12/1953 | Dingledy | 501/38 |
| 2,882,173 | 4/1959 | Welsch | 501/38 |
| 3,013,888 | 12/1961 | de Lajarte | 501/67 |
| 3,600,205 | 8/1971 | Breton | 501/57 |
| 4,118,239 | 10/1978 | Gagin | 501/38 |
| 4,203,774 | 5/1980 | Battigelli et al. | 501/35 |
| 4,243,423 | 1/1981 | Hohman | 501/66 |
| 4,325,724 | 4/1982 | Froberg | 501/35 |
| 4,510,252 | 8/1985 | Potter | 501/59 |

FOREIGN PATENT DOCUMENTS 56-145132 11/1981 Japan .................. 252/520

Primary Examiner—Helen M. McCarthy
Attorney, Agent, or Firm—Oblon, Fisher, Spivak, McClelland & Maier

[57] ABSTRACT

Glass fibers having the following constituents in the ranges of proportions indicated: $SiO_2$, 57–70 wt. %; $Al_2O_3$, 2–7 wt. %; CaO, 5–10 wt. %; MgO, 0–4 wt. %; $B_2O_3$, 0–4.5 wt. %; and F, 0.5–4 wt. %; and wherein $B_2O_3$ and F are present in amounts according to the relationship:

$$3 \leq B_2O_3 + 1.5\ F \leq 6.5$$

and wherein the fibers also contain the alkali oxides $Na_2O$ and $K_2O$, in amounts according to the relationship:

$$16\ \text{wt.}\ \% < Na_2O + K_2O < 20\ \text{wt.}\ \%.$$

The glass fibers are used advantageously in thermal and/or acoustic insulation.

10 Claims, No Drawings

GLASS FIBERS AND A COMPOSITION FOR MANUFACTURING THE SAME

BACKGROUND OF THE INVENTION

1. Field of the Invention

The present invention relates to compositions for glass which are used for manufacturing fibers. In particular, the present invention relates to compositions which can be drawn in the form of discontinuous fibers with the aid of compressed air, water vapor jets, hot gas or centrifugal force.

2. Description of the Prior Art

Glass compositions currently employed in the manufacture of fibers have resulted from a compromise between the desired fiber properties, the costs of different starting materials and the constraints imposed by the process apparatus. In general, most of the known compositions employed for fiber manufacture satisfy some of the imposed constraints. However, such compositions suffer from other disadvantages such as those relating to economic considerations.

For example, many of the known compositions have a large number of constituents, which means that a large number of vitrifiable raw materials are needed to produce the glass. This multiplicity of raw materials limits the search for new sources of material supplies, and results in increased costs of stocking and storage.

Moreover, a number of the constituents of the known compositions come from raw materials which are, themselves, costly. The number and/or proportion of such constituents in the glass composition substantially increases the cost of the manufactured glass.

Further, the fusion of certain known compositions in gas-heated furnaces often results in the evolution of volatile materials. This volatilization necessitates an increased proportion of the more volatile constituents in the vitrifiable mixture, and requires installation of equipment to clean the offgases.

The relatively recent introduction of electric furnaces has led to a reduction in losses in volatilization. However, many of the known compositions, which are very satisfactory in some respects, are not suited to electric fusion. When such compositions are fused in an electric furnace, it is found that the layer of vitrifiable mixture which covers the glass batch is not stable. Gaseous pockets form which burst and intermittently expose the surface of the glass. These phenomena cause substantial heat losses and losses of material by volatilization which, and, while less important than the losses observed in gas heated furnaces, nonetheless pose a problem.

Therefore, a need clearly exists for a composition for manufacturing glass fibers which provides for the economical production of such fibers, and which can be fused stably and uniformly in an electric furnace.

SUMMARY OF THE INVENTION

Accordingly, it is an object of the present invention to provide glass compositions which can be fused stably and uniformly in an electric furnace.

It is also an object of this invention to provide glass compositions which are made of a limited number of constituents, with only a small amount of costly constituents.

Moreover, it is also an object of the present invention to provide glass compositions which exhibit excellent viscosity and devitrification characteristics.

Further, it is an object of the present invention to provide glass fibers which are made of a composition which has the above-described properties.

According to the present invention, the foregoing and other objects are attained by provided glass fibers which contains $SiO_2$, in the amount of about 57–70 wt.%; $Al_2O_3$, in the amount of about 2–7 wt.%; CaO, in the amount of about 5–10 wt.%; MgO, in the amount of 0 to about 4 wt.%; $B_2O_3$, in the amount of 0 to about 4.5 wt.%; and F in the amount of about 0.5 to 4 wt.%; and wherein the $B_2O_3$ and F are present in an amount according to the following relationship:

$$3 \text{ wt.}\% \leq B_2O_3 + 1.5F \leq 6.5 \text{ wt.}\%,$$

and wherein the glass fibers also contain the alkali oxides, $Na_2O$ and $K_2O$, in an amount according to the following relationship:

$$16 \text{ wt.}\% < Na_2O + K_2O < 20 \text{ wt.}\%.$$

DETAILED DESCRIPTION OF THE PREFERRED EMBODIMENTS

According to the present invention, it is now possible to provide glass fibers and glass compositions for making the fibers which are made of a limited number of constituents, with only a small amount of costly constituents. The fibers of the present invention are, moreover, made of glass compositions which can be fused stably and uniformly in an electric furnace.

The glass compositions of the present invention are drawn in a process which entails feeding molten glass to a hollow body which is spinning at a high rate and which has a peripheral wall having a plurality of orifices through which the glass is projected horizontally by centrifugal force. Primary fibers are formed thereby which are then drawn downward by the action of flames or a hot gas stream.

This process and the equipment for using the process are described in French Pat. Nos. 1,382,917 and 2,443,436.

According to the present invention, it is now possible to assure the uniform escape of the glass evolved in the decomposition of the starting materials, thereby yielding a particularly stable fusion process and product.

Without being able to offer a complete explanation, the present invention has now discovered that the systematic introduction of fluorine or fluorides into the compositions of the present invention results in the uniform escape of the decomposition gases.

The viscosity and devitrification characteristics of the present glasses are controlled in particular by the introduction of $Na_2O$ and $K_2O$, $B_2O_3$, and F.

The effects of boron and F, respectively, on the viscosity of the glass are such that these two elements or constituents containing these elements are introduced into the composition while taking into consideration the effect of each when they are combined.

In order to precisely control the overall effect of the boron and F on the viscosity while maintaining these two elements within economically acceptable proportions (by weight, relative to the weight of the entire composition), the following limits are observed:

3 wt.% ≦ $B_2O_3$ + 1.5F ≦ 6.5 wt.%.

Here the 1.5 factor applied to the fluorine or fluoride content represents the effect of fluorine or fluoride on the viscosity relative to that of the $B_2O_3$. Thus, for example, 2 wt.% of fluorine or fluoride in the glass has practically the same effect on the viscosity of the glass as 3 wt.% of $B_2O_3$.

Observation of these limits also enables one to optimize the effect of boron and F on devitrification, and facilitates the production of glasses which begin crystallizing at very low temperatures.

In order to lower the viscosity while obtaining excellent devitrification characteristics, the present compositions also contain (in addition to boron and fluorine or fluoride) alkali oxides $Na_2O$ and $K_2O$, which are introduced according to the following limits:

16 wt.% < $Na_2O$ + $K_2O$ < 20%.

In general, the glass fibers and glass compositions of the present invention contain the following constituents, in the ranges of proportions stated:

| | |
|---|---|
| $SiO_2$ | 57 to 70 wt. % |
| $Al_2O_3$ | 2 to 7 wt. % |
| CaO | 5 to 10 wt. % |
| MgO | 0 to 4 wt. % |
| $B_2O_3$ | 0 to 4.5 wt. %, and |
| F | 0.5 to 4 wt. %. |

In addition, the alkali oxides $Na_2O$ and $K_2O$ are added in the amounts indicated in the above inequality, and the $B_2O_3$ and F are subjected to the limits presented above.

Preferably, the glass fibers and glass compositions of the present invention contain the above constituents in the ranges of proportions as follow, defining two ranges:

| | |
|---|---|
| $SiO_2$ | 60 to 67 wt. % |
| $Al_2O_3$ | 3 to 5 wt. % |
| CaO | 6 to 9 wt. % |
| MgO | 0.5 to 3.5 wt. % |
| $B_2O_3$ | 0 to 4.5 wt. %, and |
| F | 0.5 to 4 wt. % |
| $SiO_2$ | 62 to 67 wt. % |
| $Al_2O_3$ | 3 to 4.5 wt. % |
| CaO | 7 to 8 wt. % |
| MgO | 2 to 3.5 wt. % |
| $B_2O_3$ | 0 to 4.5 wt. %, and |
| F | 1 to 4 wt. %, | wherewith these different compositions also contain the oxides $Na_2O$ and $K_2O$ in the proportions indicated in the above inequality.

Thus, two ranges comprising the described preferred compositions are defined as containing the following ranges of proportions:

| | |
|---|---|
| $SiO_2$ | 62 to 67 wt. % |
| $Al_2O_3$ | 3 to 4.5 wt. % |
| CaO | 7 to 8 wt. % |
| MgO | 2 to 3.5 wt. % |
| $Na_2O$ | 14 to 17 wt. % |
| $K_2O$ | 0.5 to 3.5 wt. % |
| $B_2O_3$ | 0 to 4.5 wt. %, and |
| F | 1 to 4 wt. % |
| and | |
| $SiO_2$ | 62 to 67 wt. % |
| $Al_2O_3$ | 3 to 4.5 wt. % |
| CaO | 7 to 8 wt. % |
| MgO | 2 to 3.5 wt. % |
| $Na_2O$ | 15 to 16.5 wt. % |
| $K_2O$ | 1 to 2.5 wt. % |
| $B_2O_3$ | 0 to 4.5 wt. %, and |
| F | 1.5 to 4 wt. %. |

The compositions within the last two ranges which have the best characteristics obey the following relationship:

4[wt.%] ≦ $B_2O_3$ + 1.5F ≦ 6[wt.%].

In general, the present compositions which are the most significant with respect to having excellent viscosity and devitrification characteristics and from the economic standpoint are those which contain boron oxide and fluorine or fluoride in proportions governed by the following relation:

$B_2O_3$ + 1.5F = 4.5 wt.%.

In order to satisfy the necessity for a fluorine or fluoride content according to the above-described relationships, various fluoride compounds can be used. For example, beryllium fluoride or aluminum fluoride can be used. Also, the alkali or alkaline earth fluorides, such as potassium fluoride or sodium fluoride or calcium fluoride or magnesium fluoride, can be used. Additionally, mixtures of the above may also be used.

Fluorine can also be added to glass compositions as sodium silicofluoride ($Na_2SiF_6$). However, it is preferred that the fluorine be added to the glass compositions as $CaF_2$.

The present invention will be further illustrated by certain examples and references which are provided for purposes of illustration only and are not intended to limit the scope of the present invention.

EXAMPLE 1

Composition (values are given in wt.%): $SiO_2$ 64.55; $Al_2O_3$ 3.35; CaO 7.25; MgO 3.00; $Na_2O$ 15.60; $K_2O$ 1.35; $B_2O_3$ 3.60; F 0.60; Impurities 0.95; Oxygen shortfall 0.25.

Physical properties:
Viscosity: Temperature for 100 poise, 1320° C.; for 1000 p, 1075° C. and for 10,000 p, 930° C.
Devitrification: Upper devitrification temperature, 955° C.; Null temperature of devitrification 900° C.;
Temperature of maximum devitrification [rate], 820° C.;
Maximum devitrification [rate] (in um/min), 0.60;
Temperature for 1000 poise minus upper devitrification temperature (TSD): 120° C.
Temperature for 10,000 poise minus null temperature of vitrification: 30° C.

EXAMPLE 2

Composition (values given are in wt.%): $SiO_2$ 63.00; $Al_2O_3$ 3.60; CaO 7.95; MgO 3.00; $Na_2O$ 14.35; $K_2O$ 2.45; $B_2O_3$ 4.50; F 1.15; Impurities 0.48; Oxygen shortfall 0.48.

Physical properties:
Viscosity: Temperature for 100 poise, 1286° C.; for 1000 p, 1054° C.; and for 10,000 p, 911° C.
Devitrification: Upper devitrification temperature, 940° C.; Null temperature of devitrification, 890° C.;
Temperature of maximum devitrification [rate], 800° C.;
Maximum devitrification [rate] (in um/min), 0.33;

Temperature for 1000 poise minus number devitrification temperature (TSD): 114° C.
Temperature for 10,000 poise minus null temperature of vitrification: 21° C.

EXAMPLE 3

Composition (values given are in wt.%): $SiO_2$ 64.10; $Al_2O_3$ 3.30; CaO 7.85; MgO 2.90; $Na_2O$ 15.80; $K_2O$ 1.35; $B_2O_3$ 2.95; F 0.95; Impurities 1.20; Oxygen shortfall 0.40.
Physical properties:
Viscosity: Temperature for 100 poise, 1308° C.; for 1000 p, 1072° C.; and for 10,000 p, 924° C.
Devitrification: Upper devitrification temperature, 940° C.; Null temperature of devitrification, 900° C.;
Temperature of maximum devitrification [rate], 820° C.;
Maximum devitrification [rate] (in um/min), 0.67;
Temperature for 1000 poise minuse upper devitrification temperature (TSD): 132° C.
Temperature for 10,000 poise minus null temperature of vitrification: 24° C.

EXAMPLE 4

Composition (values given are in wt.%): $SiO_2$ 64.50; $Al_2O_3$ 3.40; CaO 7.25; MgO 3.10; $Na_2O$ 15.65; $K_2O$ 1.40; $B_2O_3$ 2.50; F 2.02; Impurities 1.03; Oxygen shortfall 0.85.
Physical properties:
Viscosity: Temperature for 100 poise, 1296° C.; for 1000 p, 1050° C.; and for 10,000 p, 902° C.
Devitrification: Upper devitrification temperature, 910° C.; Null temperature of devitrification, 855° C.;
Temperature of maximum devitrification [rate], 800° C.;
Maximum devitrification [rate] (in um/min), 1.00;
Temperature for 1000 poise minus upper vitrification temperature (TSD): 140° C.
Temperature for 10,000 poise minus null temperature of vitrification: 47° C.

EXAMPLE 5

Composition (values given are in wt.%): $SiO_2$ 65.90; $Al_2O_3$ 3.35; CaO 7.50; MgO 3.10; $Na_2O$ 15.95; $K_2O$ 1.45; $B_2O_3$ —; F 2.60; Impurities 1.24; Oxygen shortfall 1.09.
Physical properties:
Viscosity: Temperature for 100 poise, 1320° C.; for 1000 p, 1077° C.; and for 10,000 p, 921° C.
Devitrification: Upper devitrification temperature, 920° C.; Null temperature of devitrification, 870° C.;
Temperature of maximum devitrification [rate], 820° C.;
Maximum devitrification [rate] (in um/min), 1.84;
Temperature for 1000 poise minus upper vitrification temperature (TSD): 157° C.
Temperature for 10,000 poise minus null temperature of vitrification: 51° C.

EXAMPLE 6

Composition (values given are in wt.%): $SiO_2$ 65.50; $Al_2O_3$ 3.35; CaO 7.50; MgO 3.10; $Na_2O$ 15.70; $K_2O$ 1.45; $B_2O_3$ —; F 3.75; Impurities 1.23; Oxygen shortfall 1.58.
Physical properties:
Viscosity: Temperature for 100 poise, 1290° C.; for 1000 p, 1053° C.; and for 10,000 p, 900° C.
Devitrification: Upper devitrification temperature, 925° C.; Null temperature of devitrification, 865° C.;
Temperature of maximum devitrification [rate], 780° C.;
Maximum devitrification [rate] (in um/min), 0.27;
Temperature for 1000 poise minus upper vitrification temperature (TSD): 188° C.
Temperature for 10,000 poise minus null temperature of vitrification: 35° C.

EXAMPLE 7

Composition (values given are in wt.%): $SiO_2$ 64.25; $Al_2O_3$ 3.40; CaO 7.00; MgO 3.05; $Na_2O$ 15.55; $K_2O$ 1.50; $B_2O_3$ 3.30; F 1.20; Impurities 1.25; Oxygen shortfall 0.50.
Physical properties:
Viscosity: Temperature for 100 poise, 1332° C.; for 1000 p, 1087° C.; and for 10,000 p, 932° C.
Devitrification: Upper devitrification temperature, 920° C.; Null temperature of devitrification, 880° C.;
Temperature of maximum devitrification [rate], 820° C.;
Maximum devitrification [rate] (in um/min), 0.54;
Temperature for 1000 poise minus upper vitrification temperature (TSD): 167° C.
Temperature for 10,000 poise minus null temperature of vitrification: 52° C.

EXAMPLE 8

Composition (values given are in wt.%): $SiO_2$ 65.10; $Al_2O_3$ 3.20; CaO 6.90; MgO 2.90; $Na_2O$ 15.60 $K_2O$ 1.35; $B_2O_3$ 2.95; F 1.05; Impurities 1.39; Oxygen shortfall 0.44.
Physical properties:
Viscosity: Temperature for 100 poise, 1315° C.; for 1000 p, 1080° C.; and for 10,000 p, 930° C.
Devitrification: Upper devitrification temperature, 870° C.; Null temperature of devitrification, 830° C.;
Temperature of maximum devitrification [rate], 800° C.;
Maximum devitrification [rate] (in um/min), 0.44;
Temperature for 1000 poise minus upper vitrification temperature (TSD): 2.50° C.
Temperature for 10,000 poise minus null temperature of vitrification: 100° C.

EXAMPLE 9

Composition (values given are in wt.%): $SiO_2$ 64.85; $Al_2O_3$ 3.35; CaO 7.40; MgO 2.90; $Na_2O$ 15.20; $K_2O$ 1.40; $B_2O_3$ 3.00; F 1.15; Impurities 1.23; Oxygen shortfall 0.48.
Physical properties:
Viscosity: Temperature for 100 poise, 1324° C.; for 1000 p, 1083° C.; and for 10,000 p, 933° C.
Devitrification: Upper devitrification temperature, 940° C.; Null temperature of devitrification, 870° C.;
Temperature of maximum devitrification [rate], 820° C.;
Maximum devitrification [rate] (in um/min), 0.67;
Temperature for 1000 poise minus upper vitrification temperature (TSD): 213° C.
Temperature for 10,000 poise minus null temperature of vitrification: 63° C.

EXAMPLE 10

Composition (values given are in wt.%): $SiO_2$ 69.00; $Al_2O_3$ 2.00; CaO 5.00; MgO—; $Na_2O$ 16.00; $K_2O$ 3.70; $B_2O_3$ 2.50; F 2.00; Impurities 0.64; Oxygen shortfall 0.84.
Physical properties:
Viscosity: Temperature for 100 poise, 1294° C.; for 1000 p, 1054° C.; and for 10,000 p, 906° C.
Devitrification: Upper devitrification temperature, 970° C.; Null temperature of devitrification, 870° C.;
Temperature of maximum devitrification [rate], 820° C.;
Maximum devitrification [rate] (in um/min), 0.12;
Temperature for 1000 poise minus upper vitrification temperature (TSD): 84° C.

Temperature for 10,000 poise minus null temperature of vitrification: 36° C.

In each of the foregoing examples, the fluorine content (F) refers to $CaF_2$ added to the glass compositions.

The glass fiber compositions of the present invention have a number of remarkable characteristics, as can be seen from the preceding Examples.

The glasses also have low viscosity. Taking a familiar point of reference, the 1000 poise viscosity [point], the temperature for this viscosity is less than or equal to 1100° C. for the inventive glasses.

Moreover, the glass fiber compositions of the present invention devitrify at exceptionally low temperatures. For example, the upper devitrification temperature is generally below 980° C., and in the majority of cases the upper devitrification temperature is below 960° C.

The difference between the 1000 poise temperature and the upper devitrification difference is generally greater than 100° C., and occasionally exceeds 200° C.

The temperature corresponding to the zero devitrification rate, called the liquidus curve, is generally less than 920° C., and in the majority of cases it is less than or equal to 900° C.

The difference between the 10,000 phase temperature and the liquidus is always an ample positive number. This figure is an important criterion for judging the suitability of the starting material for the fiber manufacturing (for the centrifugation methods described, e.g., in the above-cited patents), with respect to devitrification. When the figure is positive, the risk of devitrification in the fiber manufacturing equipment is practically nil.

Finally, the temperature corresponding to the maximum crystal growth rate is generally below 840° C., and very often is less than or equal to 820° C.

The figures for the maximum rate of divitrification are within normal limits for this type of glass.

Due to the combination of characteristics described above, the glass fibers and compositions therefor of the present invention are particularly suitable as materials for the manufacture of discontinuous fibers such as are employed in materials used for thermal and/or acoustic insulation, for example. Using the glass fibers of the present invention, the thermal and/or acoustic insulation can be otherwise manufactured by conventional methods.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. Glass fibers consisting essentially of the following proportions of constituents: $SiO_2$, 57 to 70 wt.%, $Al_2O_3$, 2 to 7 wt.%, CaO, 5 to 10 wt.%, MgO, 0 to 4.0 wt.%, $Na_2O$, 14 to 17 wt.%, $K_2O$, 0.5 to 3.5 wt.%, $B_2O_3$, 0 to 4.5 wt.%, and F, 0.5 to 4 wt.%, wherein the alkaline oxides are in proportions:

$$16 \text{ wt.\%} < Na_2O + K_2O < 20 \text{ wt.\%}$$

and wherein wt.% $B_2O_3$ and 1.5×wt.% fluorine content is in accordance with:

$$3 \leq B_2O + 1.5F \leq 6.5,$$

wherein said fibers have an upper devitrification temperature of below 980° C. and the temperature corresponding to the zero devitrification rate is less than 920° C.

2. The glass fibers according to claim 1, consisting essentially of the following proportions of constituents: $SiO_2$, 60 to 67 wt.%, $Al_2O_3$, 3 to 5 wt.%, CaO, 6 to 9 wt.%, MgO, 0.5 to 3.5 wt.%, $Na_2O$, 14 to 17 wt.%, $K_2O$, 0.5 to 3.5 wt.%, $B_2O_3$, 0 to 4.5 wt.%, and F, 0.5 to 4 wt.%.

3. The glass fibers according to claim 1, consisting essentially of the following proportions of constituents: $SiO_2$, 62 to 67 wt.%, $Al_2O_3$, 3 to 4.5 wt.%, CaO, 7 to 8 wt.%, MgO, 2 to 3.5 wt.%, $Na_2O$, 14 to 17 wt.%, $K_2O$, 0.5 to 3.5 wt.%, $B_2O_3$, 0 to 4.5 wt.%, and F, 1 to 4 wt.%.

4. The glass fibers according to claim 1, wherein said fibers consist essentially of $SiO_2$, in the range of 62–67 wt.%; $Al_2O_3$, in the range of 3–4.5 wt.%; CaO, in the range of 7–8 wt.%; MgO, in the range of 2–3.5 wt.%; $Na_2O$, in the range of 15–16.5 wt.%; $K_2O$, in the range of 1–2.5 wt.%; $B_2O_3$, in the range of 0–4.5 wt.%; and F, in the range of 1.5–4 wt.%; and wherein the following relationship is satisfied:

$$3 \leq B_2O_3 + 1.5F \leq 6.5.$$

5. The glass fibers according to claim 1, wherein said $B_2O_3$ and F are present in an amount according to the relationship:

$$4 \leq B_2O_3 + 1.5F \leq 6.$$

6. The glass fibers according to claim 1, wherein said $B_2O_3$ and F are present in an amount according to the relationship:

$$B_2O_3 + 1.5F = 4.5.$$

7. The glass fibers according to claim 1, wherein said glass fibers have an upper devitrification temperature of below 960° C.

8. The glass fibers according to claim 1, wherein the temperature corresponding to the zero devitrification rate is less than or equal to 900° C.

9. A material for thermal or acoustic insulation or a combination thereof comprising the glass fibers according to claim 1.

10. A composition capable of being fused stably and uniformly in an electric furnace to form a glass, and having excellent viscosity and devitrification properties, which consists essentially of $SiO_2$, in the range of 57–70 wt.%; $Al_2O_3$, in the range of 2–7 wt.%; CaO, in the range of 5–10 wt.%; MgO, in the range of 0–4 wt.%; $Na_2O$, in the range of 1–17 wt.%; $K_2O$, in the range of 0.5–3.5 wt.%; $B_2O_3$, in the range of 0–4.5 wt.%; and F, in the range of 0.5–4 wt.%; and wherein wt.% of said $B_2O_3$ and 1.5×wt.% F are present in an amount according to the following relationship:

$$3 \leq B_2O_3 + 1.5F \leq 6.5,$$

and wherein said $Na_2O$ and $K_2O$ proportions satisfy the following relationship:

$$16 \text{ wt.\%} < Na_2O + K_2O < 20 \text{ wt.\%}.$$

* * * * *

UNITED STATES PATENT AND TRADEMARK OFFICE
CERTIFICATE OF CORRECTION

PATENT NO.    :   4,615,988
DATED         :   OCTOBER 7, 1986
INVENTOR(S)   :   SIMONE LE MOIGNE ET AL

It is certified that error appears in the above-identified patent and that said Letters Patent is hereby corrected as shown below:

In Column 3, line 45, insert "and" before $SiO_2$.

In Column 5, line 68, please delete "188°C" and insert --128°C--.

In Column 6, line 34, please delete "2.50°C" and insert --210°C--.

In Column 6, line 51, please delete "213°C" and insert --143°C--.

Signed and Sealed this

Seventh Day of April, 1987

Attest:

DONALD J. QUIGG

Attesting Officer

Commissioner of Patents and Trademarks